United States Patent
Shima

(10) Patent No.: US 7,050,192 B2
(45) Date of Patent: May 23, 2006

(54) NETWORK PRINTER FOR PRINTING EDITED CONTENTS ON A NETWORK AND METHOD FOR PRINTING CONTENTS ON THE NETWORK

(75) Inventor: Toshihiro Shima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 267 days.

(21) Appl. No.: 09/860,179

(22) Filed: May 18, 2001

(65) Prior Publication Data
US 2003/0035144 A1 Feb. 20, 2003

(30) Foreign Application Priority Data
May 19, 2000 (JP) .............................. 2000-148548

(51) Int. Cl.
G06F 15/00 (2006.01)
(52) U.S. Cl. ................... 358/1.18; 358/1.15; 358/1.13; 358/1.12
(58) Field of Classification Search ............... 358/1.18, 358/1.15, 1.12, 1.13, 1.1, 1.14; 707/513, 707/528
See application file for complete search history.

(56) References Cited

U.S. PATENT DOCUMENTS

| | | | | |
|---|---|---|---|---|
| 5,761,663 | A | * | 6/1998 | Lagarde et al. ................ 707/10 |
| 5,898,823 | A | | 4/1999 | Sorkin et al. ................ 395/114 |
| 5,901,286 | A | * | 5/1999 | Danknick et al. ........... 709/203 |
| 6,029,182 | A | | 2/2000 | Nehab et al. |
| 6,278,449 | B1 | * | 8/2001 | Sugiarto et al. ............. 345/826 |
| 6,330,611 | B1 | | 12/2001 | Itoh et al. |
| 6,362,894 | B1 | * | 3/2002 | Shima ........................ 358/1.15 |
| 6,434,524 | B1 | * | 8/2002 | Weber ......................... 704/257 |

FOREIGN PATENT DOCUMENTS

| | | |
|---|---|---|
| JP | 10-232846 A | 9/1998 |
| JP | 10-254912 A | 9/1998 |
| JP | 11-312069 | 11/1999 |
| JP | 11-355498 A | 12/1999 |
| JP | 2000-39981 | 2/2000 |
| WO | WO 00/14625 | 3/2000 |

OTHER PUBLICATIONS

Office Action issued in Japanese Patent Application No. 2000-148548 on Mar. 4, 2003 (1 pg.), with Statement of Relevance (1 pg.).

* cited by examiner

Primary Examiner—Twyler M. Lamb
(74) Attorney, Agent, or Firm—Osha Liang LLP

(57) ABSTRACT

The invention makes use of that fact that the layout of a web page providing a variety of contents is rarely modified but only the contents in the layout is modified. A network printer stores in advance a network address (for example URL) where contents are retained, location information of the necessary contents in the contents retained at an address site and described in a predetermined language (for example HTML) and the print layout information of the contents. The network printer accesses the site on the network with a preset timing, receives the retained contents, extracts the necessary contents from the received contents according to the contents location information, and prints the necessary contents according to the print layout information.

16 Claims, 6 Drawing Sheets

NETWORK PRINTER FOR PRINTING EDITED CONTENTS ON A NETWORK AND METHOD FOR PRINTING CONTENTS ON THE NETWORK

BACKGROUND OF THE INVENTION

1. Field of the Invention

The present invention relates to a network printer for automatically receiving, editing and printing contents on a network such as the internet and a method for printing contents on the network.

The present application is based on Japanese Patent Application No. 2000-148548, which is incorporated herein by reference.

2. Description of the Related Art

A related art network printer is connected to a network such as a LAN and shared by a plurality of host computers. The main feature of such a network printer is limited to receiving a print job from the host computer connected to the network and printing images corresponding to the print job.

ON the other hand, contents retained by a server on a network such as the internet are generally described in the HTML (Hyper Text Markup Language), obtained by using a browser installed in a host computer and displayed on the host computer screen. Necessary sections of the contents are printed on a printer according to the instruction from the operator. Or, the host computer can retain the contents described in the HTML in its memory area and display or print the contents later.

With the widespread use of the internet, it is possible to obtain all the target contents from web pages on the internet every morning. Contents to be obtained every morning include, for example, daily headline news information, weather forecast information in the nearby area, stock price information on the user's stocks, and the user's bank balance information.

Web sites that retain such information may be often varied or such information may often reside in difference URLs in the same web site. Thus, to obtain such information routinely at a predetermined time (such as every morning), the operator or user has to access respective web sites, receive the necessary contents in the HTML document format, display the contents via a browser, and print necessary sections. In case a plurality of web sites must be visited, it is necessary to perform a cumbersome operation of accessing each web site and select necessary contents on the host computer.

Further, contents retained in a web site may not always be composed of necessary information alone. A web site contains various information such as the contents of the site, a variety of banner ads and unnecessary contents. Thus, printing a web page containing necessary contents outputs an image containing unnecessary contents also. In order to avoid this, the user may specify necessary sections of the web page for printing. This requires operation on the browser each time and in case information is obtained from a plurality of web sites, printed pages corresponding to the web sites are output.

SUMMARY OF THE INVENTION

An object of the invention is to provide a network printer that can print only necessary sections of contents on a network in a customized layout and a method for printing contents on the network.

Further object of the invention is to provide a network printer that can automatically print specified contents in a customized layout without requiring operation on the host computer and a method for printing contents on the network.

In order to attain the objects, one aspect of the invention is characterized in that a network printer stores in advance a network address (for example URL) where contents are retained, location information of the necessary contents in the contents retained at an address site and described in a predetermined language (for example HTML) and the print layout information of the contents, and accesses the site on the network with a preset timing, receives the retained contents, extracts the necessary contents from the received contents according to the contents location information, and prints the necessary contents according to the print layout information.

For example, in case the contents retained by a site are an HTML document, the location of necessary contents in an area defined by tags in the HTML document, and stores the print layout of the contents in the HTML document format. Via this, a printer connected to a network accesses the preset URL to obtain the HTML document, extracts the contents in the area defined by the tags, and embeds the contents in the HTML document where the print layout is described to print the necessary contents at the site having the URL preset by the operator in the preset layout.

Providing such a network printer eliminates the need for accessing a plurality of websites, selecting necessary contents, and printing the contents every morning, and also allows a plurality of contents to be printed in a desired layout thus obtaining a customized internet newspaper.

Another aspect of the invention is characterized in that a network printer is further provided with setting on whether to obtain the contents at the destination of the hyperlink described in the necessary contents where location setting is made. In case setting is made to obtain the contents at the destination of the link, the network printer obtains the HTML document at the destination of the link, extracts the necessary contents in a similar way to that mentioned earlier, and prints the contents in a preset layout.

Further aspect of the invention is characterized in that a printer connected to a network comprises a contents editor that stores in advance the address of a site on the network, location information of the necessary contents in the contents retained at the site and described in a predetermined language and the print layout information of the necessary contents, and accesses the site corresponding to the address with a predetermined timing, obtains the contents retained by the site, extracts the necessary contents from the received contents according to the location information, and prints the necessary contents according to the print layout information.

A more preferred embodiment of the invention is characterized in that the contents retained by the site is described in the HTML document format and location information of the necessary contents contains tags in the HTML document and the corresponding location information. In case the contents are described in the HTML document format, identifying tags and the corresponding location information easily extracts the necessary contents from the contents obtained from a site.

A more preferred embodiment of the invention is characterized in that the print layout information is described in the HTML document format where the extracted contents are embedded. By describing print layout information in the HTML document format, it is possible to readily create a document with a plurality of types of contents embedded in a desired layout.

Still another aspect of the invention is characterized in that a method for printing contents retained by a site on a network via a printer connected to the network, the method comprising steps of: storing in advance an address of a site on the network, location information of necessary contents in the contents retained at the site and described in a predetermined language and a print layout information of the necessary contents, in the printer; accessing the site corresponding to the address with a predetermined timing via the printer to thereby obtain the contents retained by the site; extracting the necessary contents from the received contents according to the location information via the printer; and printing the necessary contents according to the print layout information via the printer. A recording medium for recording a program to make a computer to execute the aforementioned method can also be provided.

Features and advantages of the invention will be evident from the following detailed description of the preferred embodiments described in conjunction with the attached drawings.

DETAILED DESCRIPTION OF THE PREFERRED EMBODIMENTS

Figure 1:
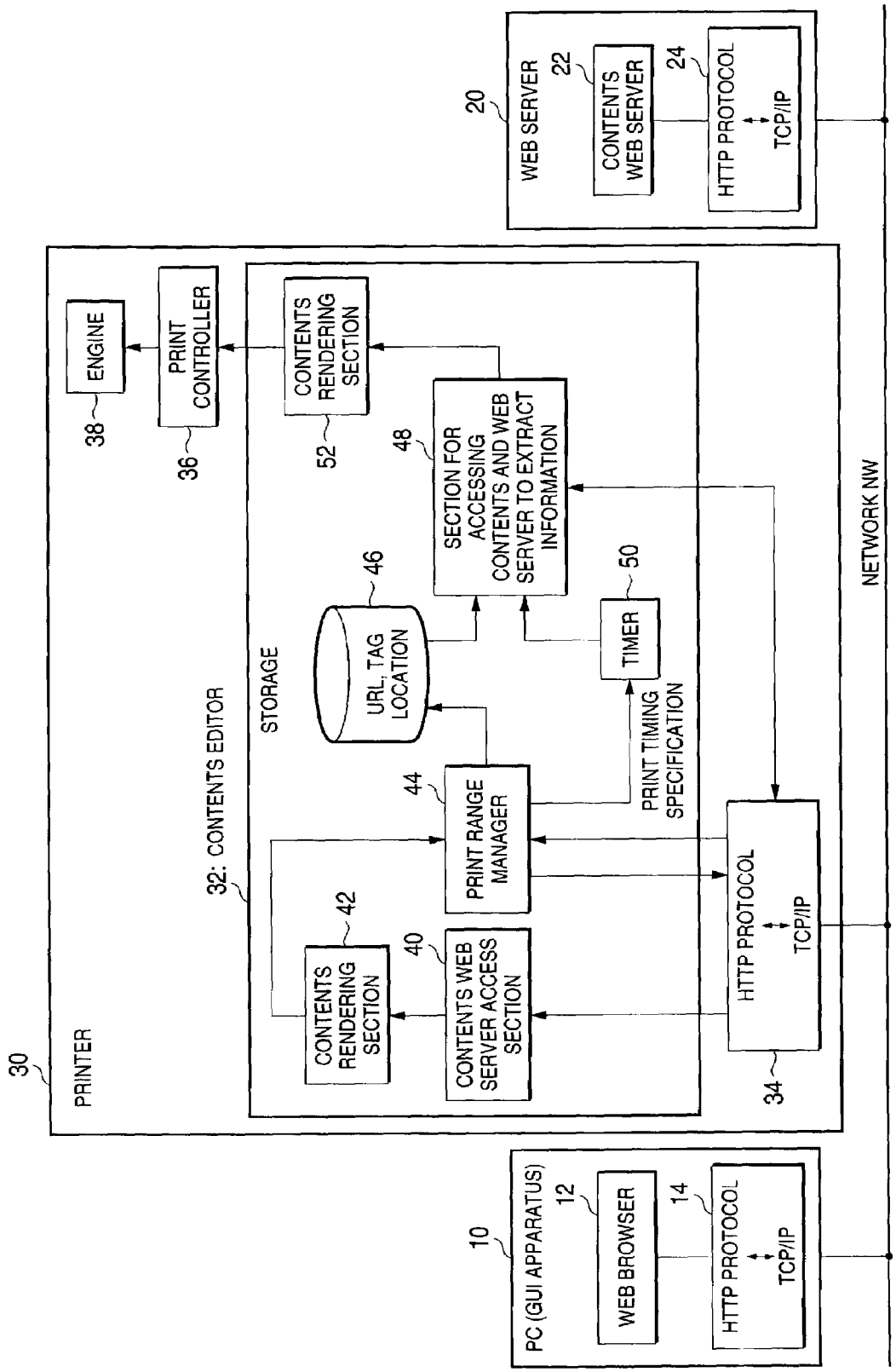
FIG. 1 shows the relationship between a network printer, a host computer and a web server.

Embodiments of the invention will be described referring to the drawings. Note that such embodiments do not limit the technical scope of the invention.

FIG. 1 shows the relationship between a network printer, a host computer and a web server. The network printer 30 is connected to the network NW via a network interface 34 conforming to protocols such as HTTP and TCP/IP. The host computer 10 is GUI (Graphical User Interface) apparatus that can display HTML documents, such as a personal computer. In order to provide the GUI feature, a web browser 12 is installed in the host computer 10, which is connected to the network NW via a network interface 14.

Similarly, a web server 20 has a contents web server 22 that retains and sends contents described in the HTML document format such as a web page. The server 22 is connected to the network NW via a network interface 24. The network printer 30, the host computer 10, and the web server 20 are respectively assigned IP addresses on the network.

The host computer 10 can access the network printer 30 by using the web browser 12 and can also access the web server 20. Similarly, the network printer 30 can access the web server 20 on a network such as the internet, and can receive the contents retained by the contents web sever 22 therein in the HTML document format.

In FIG. 1, hardware such as a router is not shown. The network NW is not necessarily the internet but may be an intranet or LAN.

The network printer shown in FIG. 1 has a contents editor 32, a print controller (controller) 36, and a print engine 38. The contents editor 32 has a contents web server access section 40 for obtaining the contents at the specified URL from the contents web server 22 in response to an instruction from the host computer 10, a contents rendering section 42 for rendering the contents, a print range manager 44 for displaying the image formed via rendering on a display of the computer 10 as a preview image and detecting the location information of the necessary contents corresponding to the specification by the host computer, and a storage 46 for storing the location information and the URL (network address) of the necessary contents detected by the print range manager 44. These features are used in setting contents.

Further, the network computer 30 has an access/extracting section 48 for accessing the contents web server 22 according to a URL stored with a specified timing to extract the necessary contents according to the location information and a contents rendering section 52 for rendering the extracted necessary contents according to the preset layout information. These features makes it possible to obtain HTML documents from a plurality of websites, extract the necessary contents according to the location information, and form images according to the preset layout with a regularly set timing. The contents editor 32 indicates for example the features implemented by software.

Then, image data for the print engine is generated by the print controller 36 as a controller and a plurality of contents are printed in a customized layout by the print engine 38.

Figure 2:
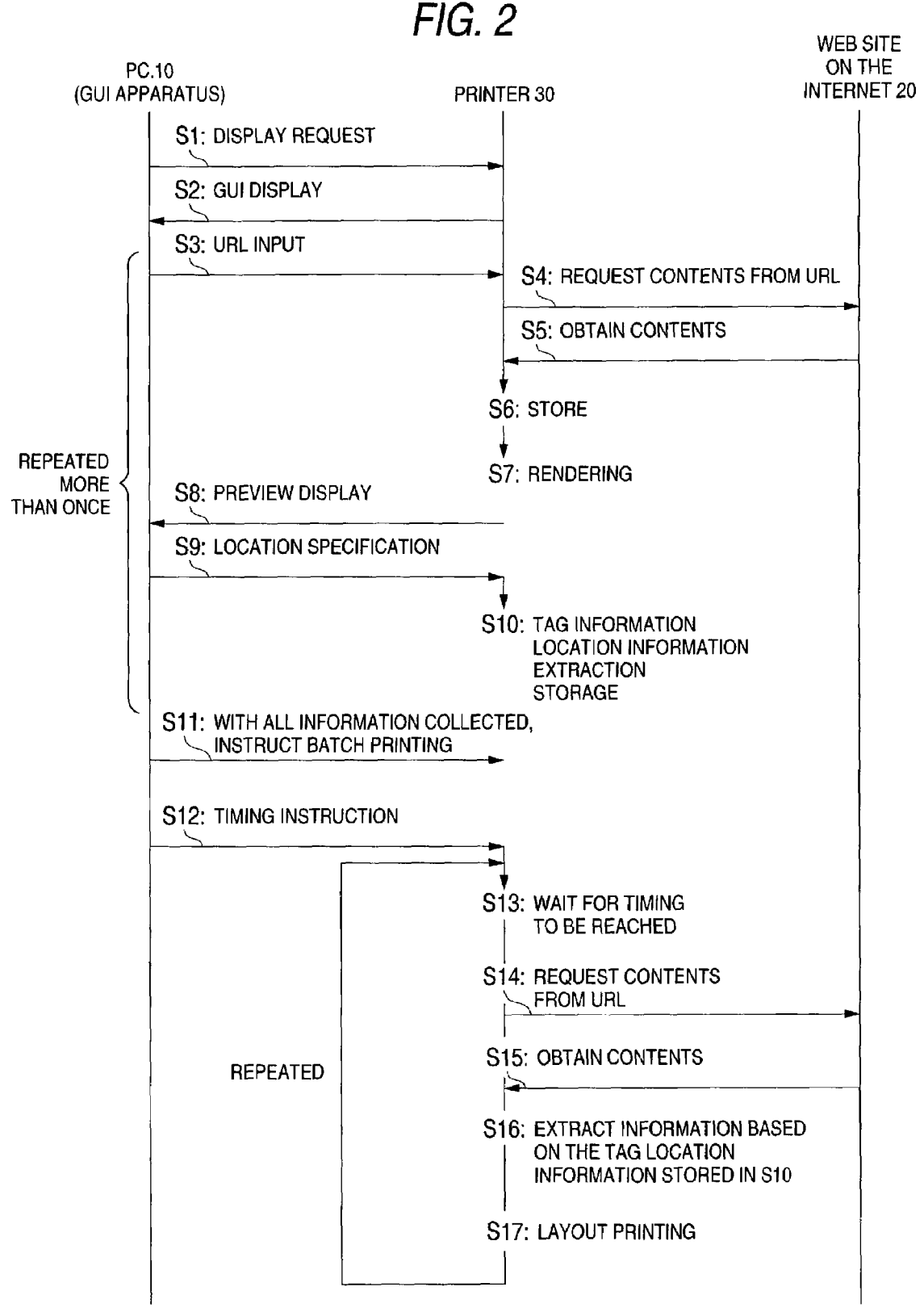
FIG. 2 shows a procedure for printing contents on a network.
Figure 3:
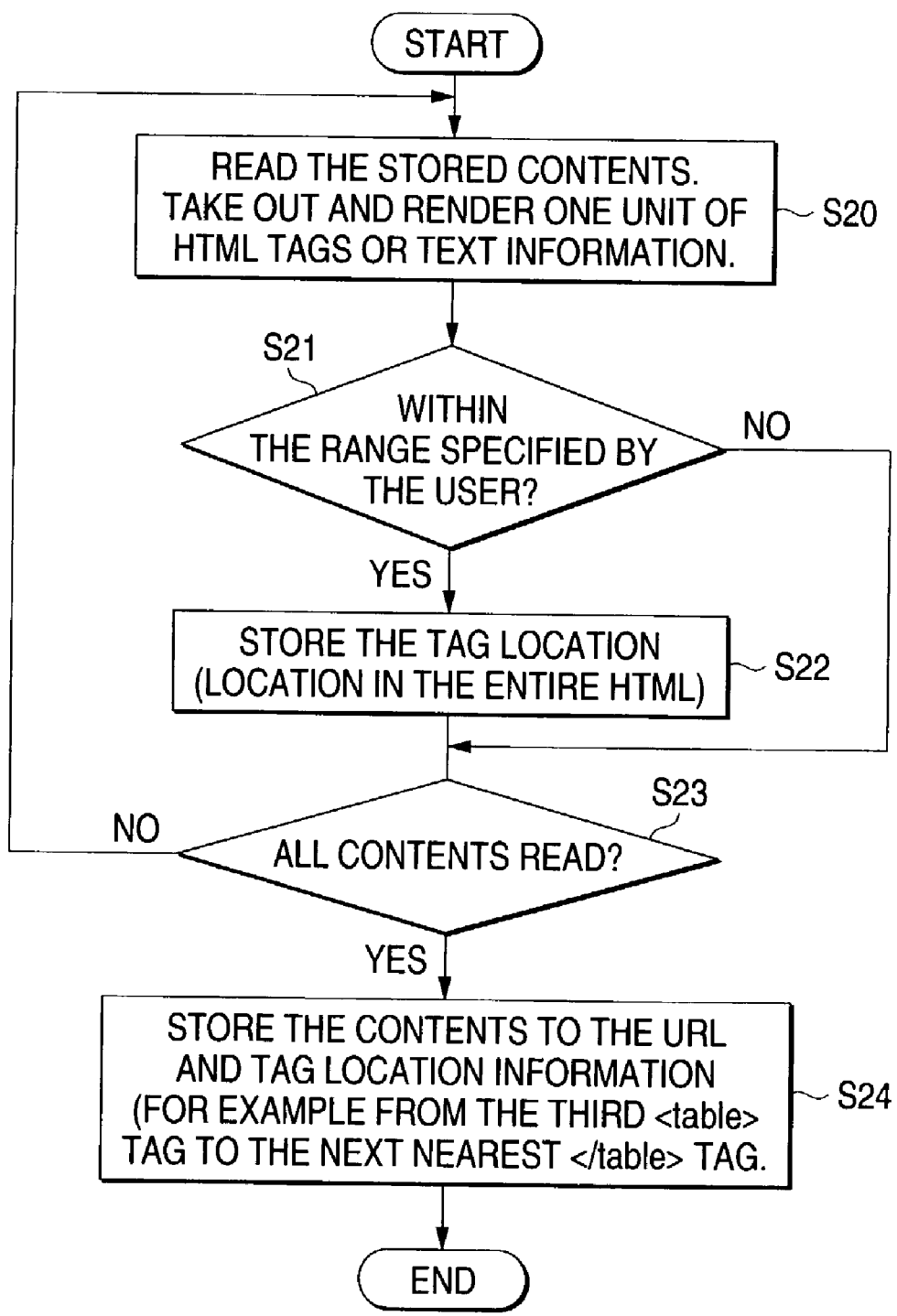
FIG. 3 shows detailed procedures for printing contents on a network.
Figure 4:
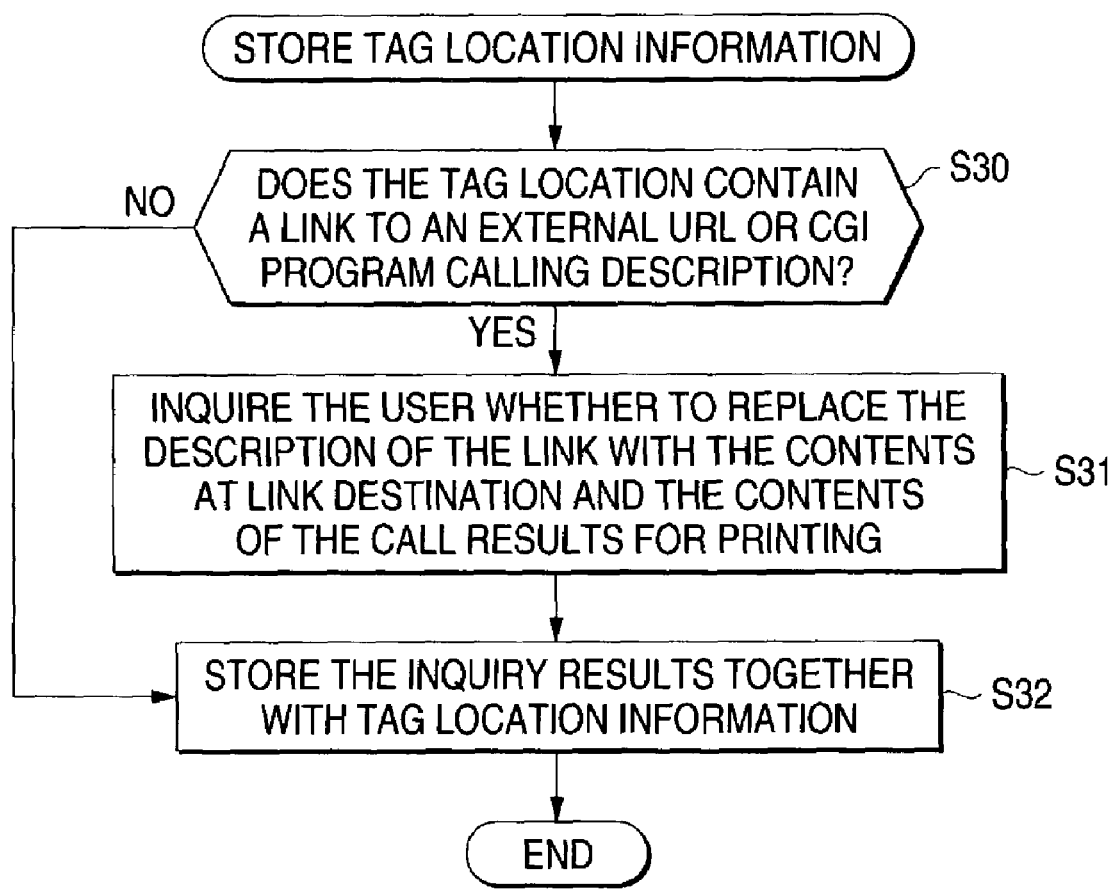
FIG. 4 shows detailed procedures for printing contents on a network.

FIG. 2 shows a procedure for printing contents on a network. FIGS. 3 and 4 show detailed procedures for printing contents on a network. The procedure for editing and printing necessary contents out of the contents retained on a network by using a network printer will be described referring to FIG. 2.

First, it is necessary to set which sections of the contents at which URL are to be printed in what layout. The network computer 10 as GUI apparatus that can display images the printer 30 rendered to generate uses the browser 12 to access the web page of the printer 30 connected to the network NW and requests display of the contents edit/setting screen (step S1).

In response to this access, the contents edit/setting screen is sent to the host computer 10 by for example the print range manager 44 of the printer (step S2). For example, a program such as Applet of JAVA is sent to the host computer 10 from the printer 30 to display a setting screen.

The operator then enters an URL to indicate the address of desired information (contents) on the setting screen of the host computer, which URL information is sent to the printer 30 (step S3).

The contents web server access section 40 of the printer 30 requests the desired contents retained by the contents web server 22 from the server 22 according to the sent URL (step S4). This feature is the same as a general feature that a web browser has. In response to this request, the contents server 22 sends the contents specified via the URL to the printer 30 for example in the HTML document format (step S5). The contents web server access section 40 in the printer 30 receives the contents and stores the contents in the storage 46.

Next, the received contents in the HTML document format is rendered by the contents rendering section 52 to generate a display image on a web page (S7). The generated display image is displayed on the display screen of the host computer 10 as a preview image by the print range manager 44 (S8). The operator specifies the location of necessary contents on the host computer while watching the preview display screen (S9). The print range manager 44 extracts the tag information and location information of the specified location in the HTML document format and stores the information in the storage 46 (S10). Location information of the tags is stored in the storage 46 in relation to URL information. The location information is such as from the third <table> tag to the next nearest </table> tag of an HTML document.

The steps S3 through S10 are repeated as many as the number of URLs of the necessary contents. With all the information collected, specification of the batch print layout is made by the host computer 10 (step S11). Specification of the print layout is done by the operator watching the display screen, via the operation of setting the layout of a web page using a web browser. Once the desired layout is determined, the layout is stored in the HTML document format to store the print layout information. Further, the timing the contents are obtained and printed is instructed from the host computer 10 and the timing information is set to a timer 50 (S12).

Figure 5:
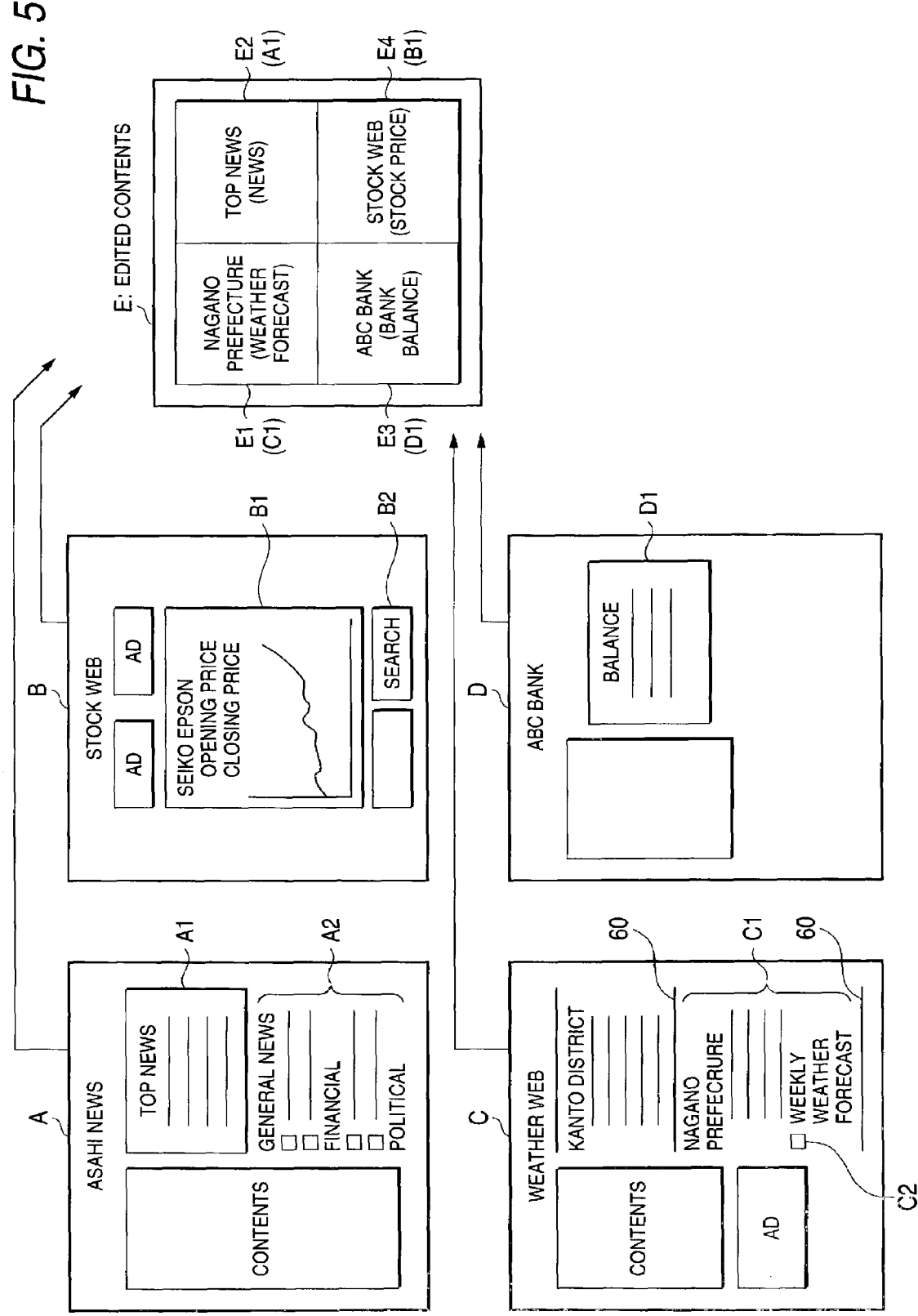
FIG. 5 shows an example of contents editing.

Specification of the location of necessary contents and the corresponding tag information and location information will be described referring to an example. FIG. 5 shows an example of contents editing. The example in FIG. 5 specifies the locations of necessary contents from each of the contents images A, B, C and D conforming to the HTML document obtained from four URLs in order to generate the contents image E edited in a desired layout.

The contents image A is a preview display of an HTML document obtained from the news site "Asahi News" and rendered thereafter. The web page A has a contents column in the left area of the screen, which first includes cell area A1 containing the top news and then area A2 such as "general news column," "financial column," and "political column." From the contents image A, cell area A1 is selected and the top news is selected as necessary contents. In the HTML document that describes the contents image A, cell area A1 containing the top news is identified by the tags specifying cell definition, "<TD> and </TD>. Thus, the tags and the tag location are extracted as location information and stored in the storage 46 together with the corresponding URL.

The contents image C is a preview display of an HTML document obtained from the weather forecast site "Weather Web" and rendered thereafter. The web page C has a contents column and ads in the left area of the screen where weather information per district is displayed while divided by ruled lines 60. In case weather information on the "Nagano Prefecture" alone is necessary, area C1 is selected. In particular, the section between the tags specifying rules lines "<HR>" is identified. The tags and the tag location are extracted as location information and stored in the storage 46 together with the corresponding URL. Via this procedure, only the weather forecast information on the Nagano Prefecture in the Weather Web is selected. On the web page C, the hyperlink C2 of the "Weekly Weather Forecast" is described. Clicking on the hyperlink C2 access the contents of the weekly weather forecast on the Nagano Prefecture.

The contents image B is a preview display of an HTML document obtained from the stock price site "Stock Web" and rendered thereafter. The web page B displays an ad on top and below the ad is displayed the stock price information of a desired company in cell area B1. Below cell area B1 is displayed area B2 for calling a CGI (Common Gateway Interface) program. The user enters a desired text in area B2 and presses the search button to search the predetermined database of the web site and display the search results. In this case, when only cell area B1 is selected, the location information identified by the tags specifying cell definition, "<TD> and </TD>" is to be stored, same as the procedure for the web page A. To specify up to the CGI program calling area B2, the tags specifying the area and the location are stored.

The contents image D is a page showing the user's bank balance from the web site of "ABC Bank." Cell area D1 is identified by the tags specifying the cell definition. Thus the tags and the location are stored.

The operator specifies what layout is to be used for contents A1, B1, C1 and D1 respectively selected from contents images A, B, C and D from the host computer. The example in FIG. 5 shows a layout where images are displayed in a table having four cells respectively. That is, the weather information contents C1, news contents A1, bank balance contents D1, and stock price contents B1 are arranged in cell E1, cell E2, cell E3 and cell E4, respectively. The edited print layout can be easily set and stored in the HTML document format by using a tool for creating typical web pages.

Figure 6:
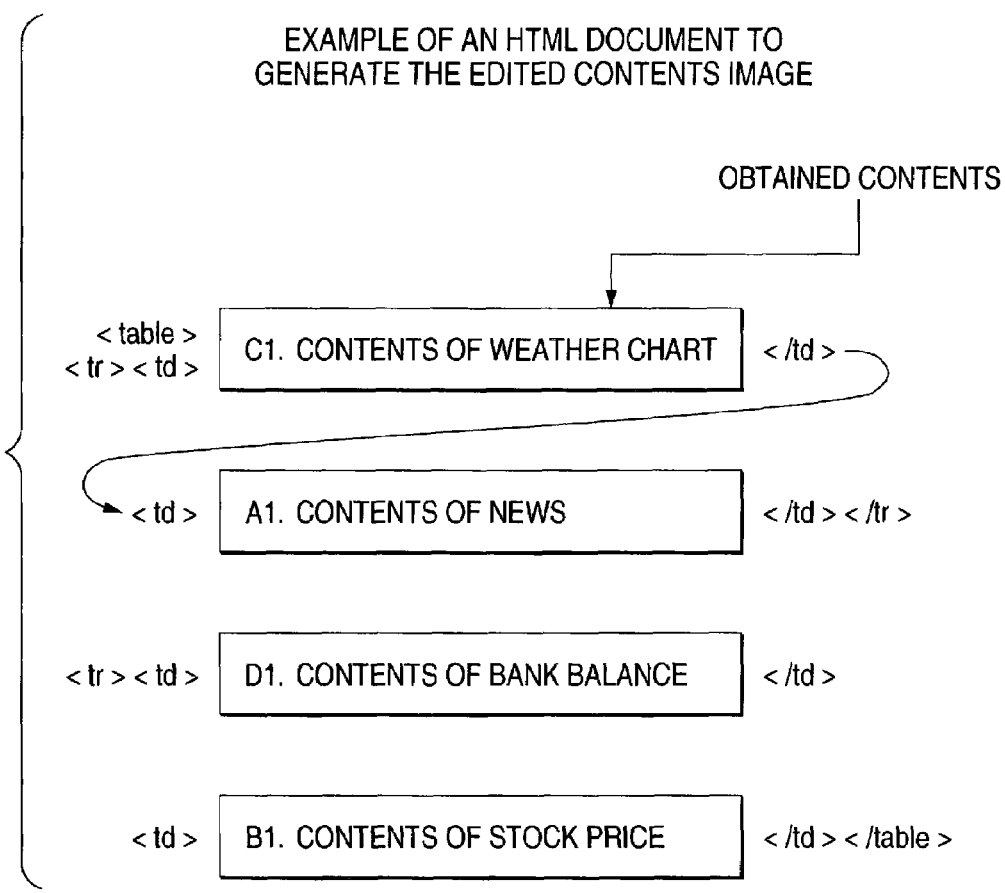
FIG. 6 shows an example of an HTML document to generate the edited contents image in FIG. 5.

FIG. 6 shows an example of an HTML document to generate the edited contents image in FIG. 5. The edited contents image first generates an HTML document that generates a table composed of four cells. Selected necessary contents are embedded as contents of the respective cells. That is, in FIG. 6, the area defined by the tags "<table> and </table>" describe a table, the tags "<tr> and </tr> describe division of columns, and the tags "<td> and </td>" describes cells. Accordingly, by embedding the necessary contents C1, A1, D1 and B1 between the tags "<td> and </td>" makes it possible to render and print the edited contents image E shown in FIG. 5.

Referring to FIG. 2 again, once the URL, tags and the location as well as the layout information are stored in the storage 46, the network printer 30 accesses the URL repeatedly with the timing set to the timer 50 to print the edited contents image. When the preset timing is reached (step S13), an access/information extracting section 48 accesses a plurality of URLs stored in the storage 46 and requests contents (S14) Then the access/information extracting section 48 obtains the contents in the HTML document format from the web server specified via the URL (S15) and extracts the necessary contents according to the tag location information stored in step S10 (S16).

The extracted contents are embedded in an HTML document with the layout shown in FIG. 6 preset. The image of the edited contents is generated by the contents rendering section 52. When the image data is supplied to the print controller (controller) 36, color conversion and binary processing are performed and print data is supplied to the print engine 38. As a result, the edited contents image E shown in FIG. 5 is printed (S17).

The steps S13 through S17 are repeated with a preset timing without requiring operation from the host computer 10. For example, the content image E in FIG. 5 is output on the printer 30 every morning so that the user can obtain a customized newspaper with the necessary contents arranged on a single form.

FIG. 3 shows a procedure for extracting the tags and the corresponding location information in step S10 in FIG. 2. In step S6, the HTML document of the contents obtained from a URL is stored in the storage 46. A location is specified by the operator on the preview display. The print range manager 44 reads the HTML document of the contents stored in the storage 46. The print range manager 44 then a unit of tags of text information in the HTML document and performs rendering again (S20). A check is made to determine whether the rendered contents are included in the range specified by the user (S21) If so, the tags and the tag location are stored (S22). That is, tag location information containing the type of tag and tag location (for example from the third <table> tag to the next nearest </table> tag) in the entire HTML document is stored in the storage 46.

The steps S20, S21 and S22 are repeated for all the HTML documents of the contents (step S23). The URL and the tag location information are stored in relation to each other in the storage 46 (S24)

While the layout of a web page is typically not frequently modified, the contents embedded in the layout are frequently modified. Thus, by specifying and storing the area of the necessary contents via description in the HTML document format, it is possible to extract only the necessary contents modified and displayed in the same area thereafter.

FIG. 4 shows a detailed step of step S22 in FIG. 3 used in case a hyperlink or CGI program calling description is contained in the area of the necessary contents. Area C1 of the selected necessary contents of contents image C in FIG. 5 contains hyperlink C2 specifying another URL "Weekly Weather Forecast." In this case, the user can select whether to print the hyperlink C2 as displayed or to print the link destination contents in area C1. Further, contents image B2 in FIG. 5 contains CGI program calling description B2 consisting of a text area and a search button. Selecting description B2 as necessary contents also allows the user to print in the area of description B2 the contents of the search results obtained by entering predetermined characters in the text for a search. Or, the user can print description B2 as displayed.

By specifying that contents at another link destination or other contents extracted by another search program be included in a contents image under editing, it is possible to specify a plurality of URLs and search results for batch printing.

Referring to FIG. 4 again, in step S22 for storing the tag location information in FIG. 3, the print range manager 44 checks whether the tag location contains a link to an external URL or CGI program calling description (S30). If so, the print range manager 44 inquires the user whether to replace the description of the link with the contents at link destination and the contents of the call results for printing (S31). A response from the user corresponding to the inquiry is stored in the storage 46 together with the tag location information.

In case the user has selected to print the replaced contents, the access/information extracting section 48 obtains the contents at the link destination and embeds the contents in contents image E under editing according to the user's setting. Or, the access/information extracting section 48 inputs the preset characters, obtains the search results and embeds the search results in contents image E under editing according to the user's setting.

The scope of the invention is not limited by the foregoing embodiments but is determined by the appended claims and their equivalents.

According to the invention, a printer connected to a network actively accesses a plurality of sites on the network to obtain the contents and prints the necessary contents therein in a customized layout, thus eliminating the need for the operator to access a plurality of sites and obtain and edit the corresponding contents.

What is claimed is:

1. A network printer comprising:
   a storage to store in advance an address of a site on a network, location information corresponding to a location in a display image of selected contents displayed at the site and described in a predetermined language and print layout information of the selected contents;
   an access/information extracting section to access the site corresponding to said address with a predetermined timing to thereby obtain the contents displayed by said site and extract the selected contents from said received contents according to said location information; and
   a print section to print the selected contents according to said print layout information,
   wherein said location information comprises at least one tag, corresponding to the location in the display image of the selected contents, extracted from a predetermined language representation of the display image.

2. A network printer according to claim 1, wherein said print layout information is described in an HTML document format where said extracted contents are embedded.

3. A network printer according to claim 1, wherein said network printer is accessed by a host computer having a display connected to said network, and setting of the address, the location information of selected contents and the print layout information is made.

4. A network printer according to claim 1, wherein the access/information extraction section analyzes the location information in accordance with a grammar of the predetermined language.

5. A network printer according to claim 1, wherein said location information comprises a tag type and a tag location for the at least one tag extracted from the predetermined language representation of the display image of the selected contents.

6. A network printer comprising:
   means for storing in advance an address of a site on a network, location information corresponding to a location in a display image of selected contents displayed at the site and described in a predetermined language and print layout information of the selected contents;
   means for accessing the site corresponding to said address with a predetermined timing to thereby obtain the contents displayed by said site;
   means for extracting the selected contents from said received contents according to said location information; and
   means for printing the selected contents according to said print layout information,
   wherein said location information comprises at least one tag, corresponding to the location in the display image of the selected contents, extracted from a predetermined language representation of the display image.

7. A network printer according to claim 6, wherein said print layout information is described in an HTML document format where said extracted contents are embedded.

8. A network printer according to claim 6, wherein said network printer is accessed by a host computer having display means connected to said network, and setting of the address, the location information of selected contents and the print layout information is made.

9. A network printer according to claim 6, wherein the accessing means analyzes the location information in accordance with a grammar of the predetermined language.

10. A network printer according to claim 6, wherein the location information comprises a tag type and a tag location for the at least one tag extracted from the predetermined language representation of the display image of the selected contents.

11. A method for printing contents retained by a site on a network via a printer connected to the network, said method comprising steps of:
    storing in advance an address of a site on said network, location information corresponding to a location in a display image of selected contents displayed at said site and described in a predetermined language and a print layout information of the selected contents, in said printer;
    accessing the site corresponding to said address with a predetermined timing via said printer to thereby obtain the contents displayed by said site;
    extracting the selected contents from said received contents according to said location information via said printer; and
    printing the selected contents according to said print layout information via said printer,
    wherein said location information comprises at least one tag, corresponding to the location in the display image of the selected contents, extracted from a predetermined language representation of the display image.

12. A method for printing contents on a network according to claim 11, wherein said print layout information is described in the HTML document format where said extracted contents are embedded.

13. A method for printing contents on a network according to claim 11, wherein the accessing step includes a step of analyzing the location information in accordance with a grammar of the predetermined language.

14. A method for printing contents on a network according to claim 11, wherein the location information comprises a tag type and a tag location for the at least one tag extracted from the predetermined language representation of the display image of the selected contents.

15. A recording medium for recording a program that prints contents retained by a site on a network via a printer connected to the network, said medium making a computer to execute the following steps:
    storing in advance an address of a site on said network, location information corresponding to a location in a display image of selected contents displayed at said site and described in a predetermined language and a print layout information of the selected contents, in said printer;
    accessing the site corresponding to said address with a predetermined timing via said printer to thereby obtain the contents displayed by said site;
    extracting the selected contents from said received contents according to said location information via said printer; and
    printing the selected contents according to said print layout information via said printer,
    wherein said location information comprises at least one tag, corresponding to the location in the display image of the selected contents, extracted from a predetermined language representation of the display image.

16. A recording medium for recording a program that prints contents retained by a site on a network via a printer connected to the network according to claim 15, wherein the location information comprises a tag type and a tag location for the at least one tag extracted from the predetermined language representation of the display image of the selected contents.

* * * * *